(12) United States Patent
Che

(10) Patent No.: US 12,185,431 B2
(45) Date of Patent: Dec. 31, 2024

(54) HEATING CLOTHING CONTROL DEVICE AND HEATING CLOTHING

(71) Applicant: Shenzhen Kusen Technology Trading Co., Ltd., Guangdong (CN)

(72) Inventor: Erjun Che, Guangdong (CN)

(73) Assignee: Shenzhen Kusen Technology Trading Co., Ltd., Shenzhen (CN)

( * ) Notice: Subject to any disclaimer, the term of this patent is extended or adjusted under 35 U.S.C. 154(b) by 0 days.

(21) Appl. No.: 18/379,150

(22) Filed: Oct. 11, 2023

(65) Prior Publication Data

US 2024/0130006 A1    Apr. 18, 2024

(30) Foreign Application Priority Data

Oct. 13, 2022   (CN) .......................... 202222702952.0

(51) Int. Cl.
   *H05B 1/02*      (2006.01)
   *A41D 13/005*    (2006.01)

(52) U.S. Cl.
   CPC ....... *H05B 1/0227* (2013.01); *A41D 13/0051* (2013.01); *H05B 2203/036* (2013.01)

(58) Field of Classification Search
   USPC ......................................................... 219/211
   See application file for complete search history.

(56) References Cited

U.S. PATENT DOCUMENTS

| | | | | |
|---|---|---|---|---|
| 3,613,682 A | * | 10/1971 | Naylor | A61B 18/10 |
| | | | | 219/233 |
| 5,032,705 A | * | 7/1991 | Batcheller | H05B 3/342 |
| | | | | 219/211 |
| 6,392,196 B1 | * | 5/2002 | Lin | A61F 11/14 |
| | | | | 219/535 |

(Continued)

FOREIGN PATENT DOCUMENTS

| | | | | |
|---|---|---|---|---|
| CN | 103584380 A | * | 2/2014 | |
| CN | 110063533 A | * | 7/2019 | |

(Continued)

OTHER PUBLICATIONS

CN-103584380-A, Feb. 2014, Chen, partial translation (Year: 2014).*

*Primary Examiner* — Nathaniel E Wiehe
*Assistant Examiner* — Thomas J Ward

(57) ABSTRACT

The present application relates to the technical field of heating clothing, specifically to a heating clothing control device and a heating clothing. The heating clothing control device includes a control circuit board, connection wires and a housing with a plurality of heating control modules. An indicator light control module and a plurality of heating control modules are provided on the control circuit board. Each accommodation area is provided therein with a limit plate. The control circuit board is placed in the housing to make the indicator light control module and the plurality of heating control modules be clipped in different accommodation areas and respectively abut against the limiting plates. The present application divides the operating areas of dif- (Continued)

ferent heating control modules by arranging a plurality of accommodation areas in the housing to reduce the influence of a certain heating control module on other heating control modules during operation.

11 Claims, 8 Drawing Sheets

(56) References Cited

U.S. PATENT DOCUMENTS

| | | | | |
|---|---|---|---|---|
| 6,713,724 B1 * | 3/2004 | Carr | ...................... | H05B 3/342 |
| | | | | 219/549 |
| 7,901,756 B2 * | 3/2011 | Burr | ...................... | B32B 27/12 |
| | | | | 223/74 |
| 8,698,044 B2 * | 4/2014 | Burr | ......................... | B32B 3/04 |
| | | | | 139/421 |
| 10,893,576 B2 * | 1/2021 | Strecker | ............... | H05B 1/0272 |
| 10,952,478 B2 * | 3/2021 | Desmeules | ........ | A41D 19/0044 |
| 11,744,298 B2 * | 9/2023 | McIntyre | ............... | A41D 1/005 |
| | | | | 126/204 |
| 2013/0037531 A1 * | 2/2013 | Gray | .................. | A41D 13/0051 |
| | | | | 219/211 |
| 2015/0271873 A1 * | 9/2015 | Gray | ..................... | H05B 1/0272 |
| | | | | 219/211 |
| 2016/0128393 A1 * | 5/2016 | Janda | ................. | A41D 13/0051 |
| | | | | 219/211 |
| 2017/0332442 A1 * | 11/2017 | Strecker | ............... | H05B 1/0272 |
| 2023/0247732 A1 * | 8/2023 | Che | ......................... | H05B 3/34 |
| | | | | 219/211 |

FOREIGN PATENT DOCUMENTS

| | | | |
|---|---|---|---|
| CN | 113693314 A | * | 11/2021 |
| JP | 3237351 U | * | 5/2022 |
| KR | 20170136876 | * | 12/2017 |
| KR | 102456924 B1 | * | 10/2021 |

* cited by examiner

HEATING CLOTHING CONTROL DEVICE AND HEATING CLOTHING

CROSS REFERENCE TO RELATED APPLICATIONS

The present application claims the benefit of Chinese Patent Application No. 202222702952.0 filed on Oct. 13, 2022, the contents of which are incorporated herein by reference in their entirety.

TECHNICAL FIELD the present application relates to the technical field of heating clothing, and in particular to a heating clothing control device and heating clothing.

BACKGROUND TECHNIQUE

Heating clothing is clothing with a heating device provided therein. The heating device in the heating clothing can provide heat to the wearer and help the wearer keep out the cold. The heating device generally includes a controller and multiple heating modules provided in different areas of the heating clothing. For increased flexibility in usage, the controller is generally equipped with multiple heating control modules to individually control heating modules in different areas. Due to structural design flaws in existing controllers, when operating a certain heating control module, it will easily affect other heating control modules.

Therefore, it is crucial for those skilled in the art to design a heating clothing control device and heating clothing that are more convenient to operate.

APPLICATION CONTENT

The technical problem to be solved by the present application is to provide a heating clothing control device and its heating clothing in view of the above-mentioned defects of the existing technology, overcoming the low sensitivity and defects that affect other heating control modules when operating a certain heating control module in the existing technology.

The technical solution adopted by the present application to solve the technical problem is to provide a heating clothing control device. The preferred solution is that the heating clothing control device includes a control circuit board, connection wires and a housing: a plurality of heating control modules are provided on the control circuit board, and each heating control module is connected to a heating area of an external heating clothing through a connection wire: a plurality of accommodation areas are provided in the housing, and each accommodation area is provided therein with a limit plate; and the control circuit board is placed in the housing to make the plurality of heating control modules be clipped in different accommodation areas and respectively abut against the limiting plate in a corresponding accommodation area. The circuit board is further provided with an indicator light control module, and the indicator light control module is connected to the plurality of heating control modules through the connection wires to turn on or turn off indicator lights of the heating control modules. Each indicator light control module is provided with an indicator light control button; and each accommodation area includes an indicator light button accommodation area for accommodating the indicator light control button; and the surface of the housing is provided with a second protrusion in a position corresponding to the indicator light control button.

Wherein, the preferred solution is that partitions are provided between different accommodation areas, and the height of the partitions is greater than the thickness of the limiting plate.

Wherein, the preferred solution is that each heating control module is provided with a heating control button, and the plurality of accommodation areas include a plurality of heating control button accommodation areas for accommodating heating control buttons; and the surface of the housing is provided with first protrusions in different positions corresponding to the heating control buttons.

Wherein, the preferred solution is that the control circuit board is further provided with a power cord and a power interface, and the power interface is electrically connected to the control circuit board through the power cord to connect an external power supply.

To solve the technical problem in the existing technology, the present application also provides a heating clothing. The preferred solution is that the heating clothing includes the above-mentioned heating clothing control device, and further includes a heating clothing body and a plurality of heating pieces arranged in the heating clothing body; and each heating piece is connected to a corresponding heating control module through a connection wire.

Wherein, the preferred solution is that each connection wire includes a wire carrier and a wire body, and the wire body extends in an undulating shape or a sinusoidal shape along the length direction of the wire carrier and is arranged inside the wire carrier.

Wherein, the preferred solution is that the wire carrier is an elastic stretchable band, and the end of the elastic stretchable band is embedded and fixed inside the heating piece.

Wherein, the preferred solution is that each heating piece includes a covering piece and a heating element: the heating element is connected to the connection wire, and the covering piece covers the end of the connection wire, the end of the wire carrier and the heating element.

The beneficial effect of the present application is that compared with the existing technology, the present application divides the operating areas of different heating control modules by arranging a plurality of accommodation areas corresponding to different heating control modules in the housing. This reduces the influence of a certain heating control module on other heating control modules during operation, effectively improving the operating portability of the heating device. By providing a limiting plate in the accommodation area, the operating sensitivity is effectively improved, thus effectively enhancing the wearer's experience.

DESCRIPTION OF THE DRAWINGS

The present application will be further described below in conjunction with the accompanying drawings and embodiments. In the accompanying drawings.

DETAILED DESCRIPTION

The preferred embodiments of the present application will now be described in detail with reference to the accompanying drawings.

As shown in FIGS. 1 to 6 and 8, the present application provides a preferred embodiment of a heating clothing control device.

Figure 1:
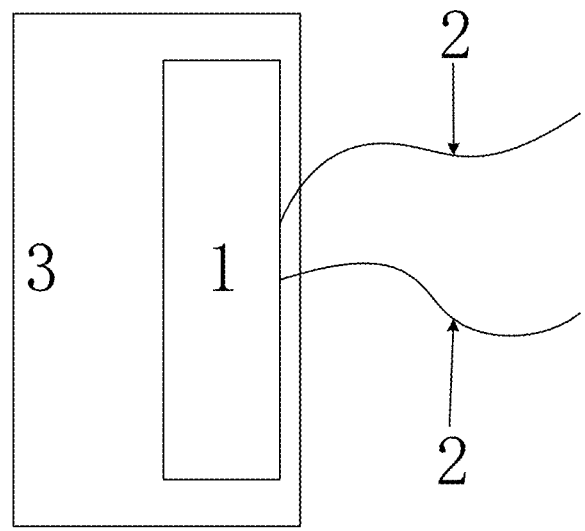
FIG. 1 is a first structural schematic diagram of a heating clothing control device in the present application.
Figure 2:
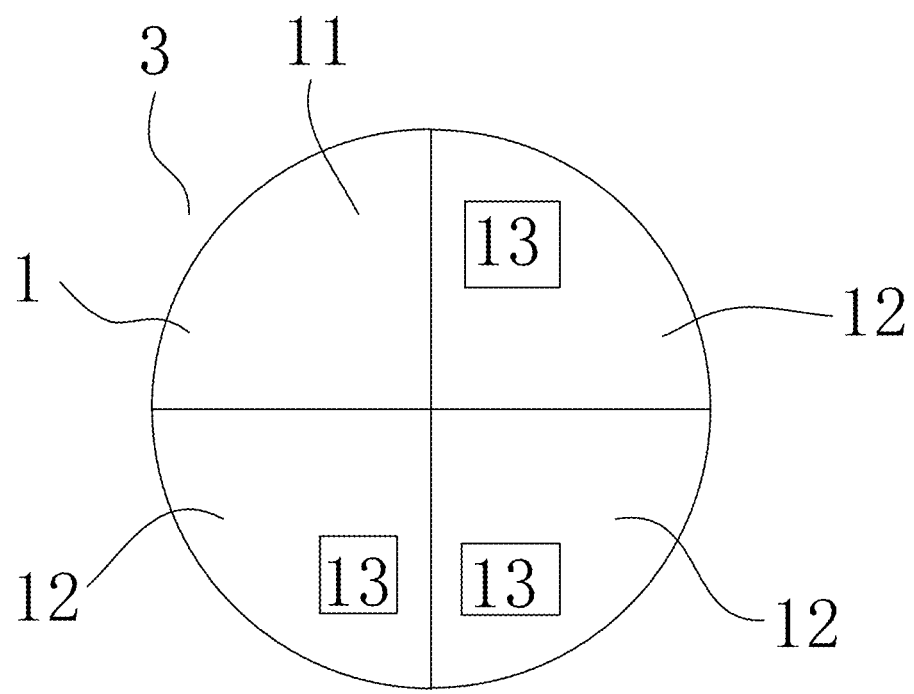
FIG. 2 is a first structural schematic diagram of a control circuit board in the present application.
Figure 10:
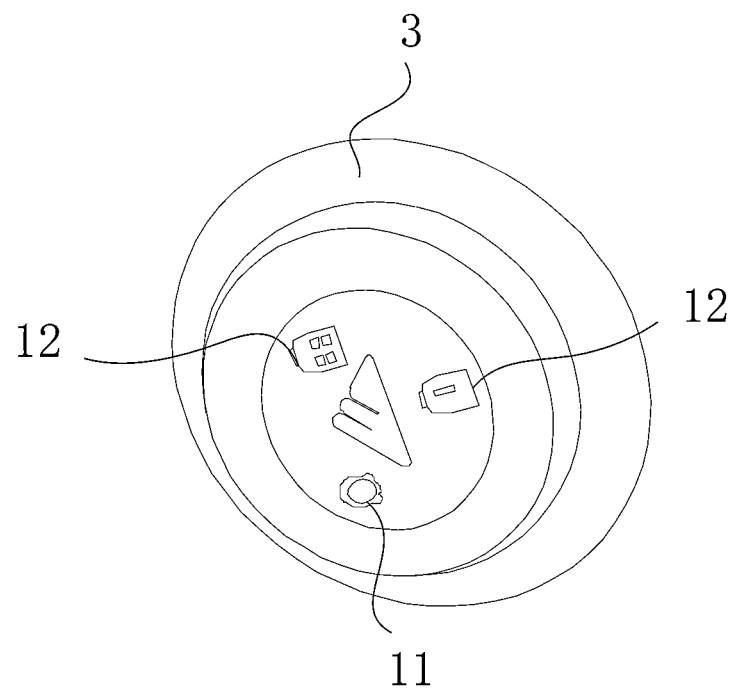
FIG. 10 is a 3D diagram of the heating clothing control device in the present application.

A heating clothing control device, referring to FIGS. 1, 2 and 10, the heating clothing control device includes a control circuit board 1, connection wires 2 and a housing 3. The control circuit board 1 is provided with an indicator light control module 11 and a plurality of heating control module 12 with an indicator light 13. Each of the heating control modules 12 is connected to a heating area 300 of the external heating clothing through a connection wire 2 to control the corresponding heating area 300 to generate heat. The indicator light control module 11 is connected to multiple heating control modules 12 through the connection wires 2 to turn on or off the indicator lights 13 of the heating control modules 12.

Figure 3:
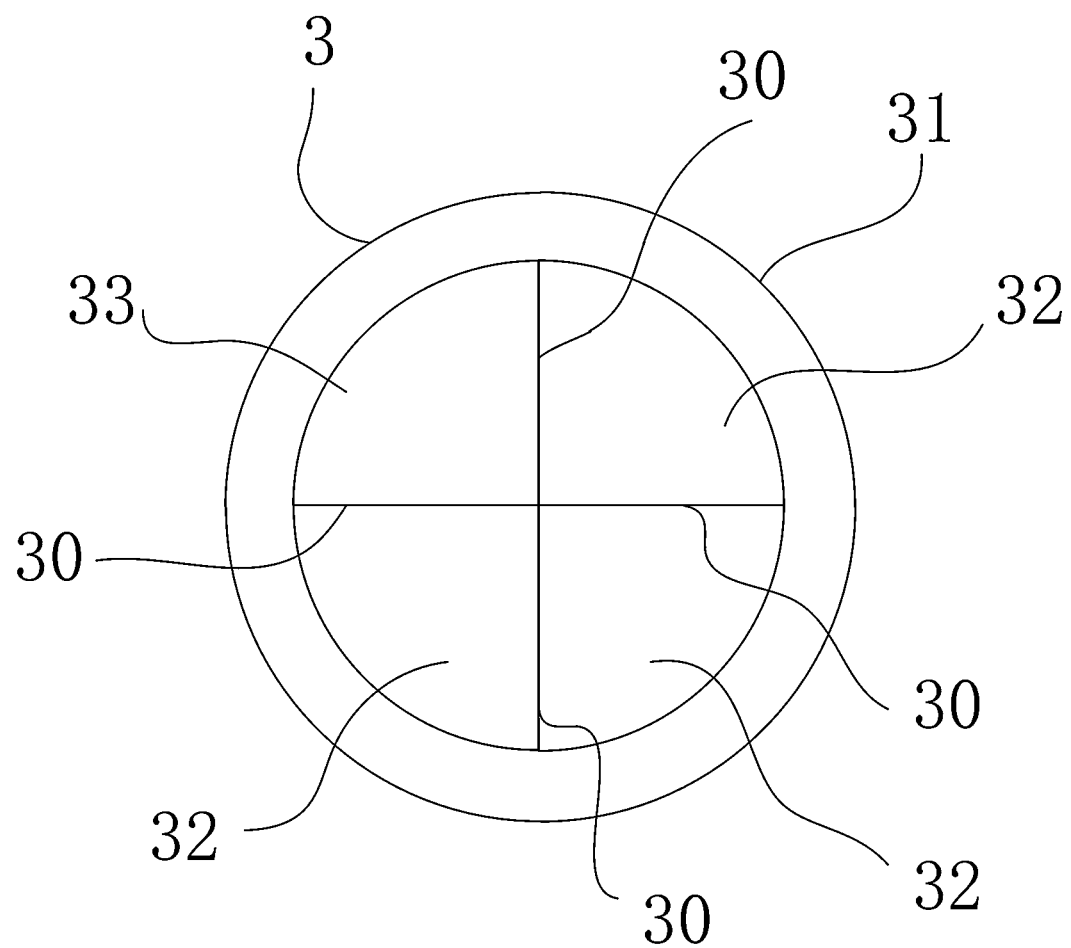
FIG. 3 is a structural schematic diagram of a heating clothing control device with heating button accommodation areas and indicator light button accommodation area in the present application.
Figure 9:
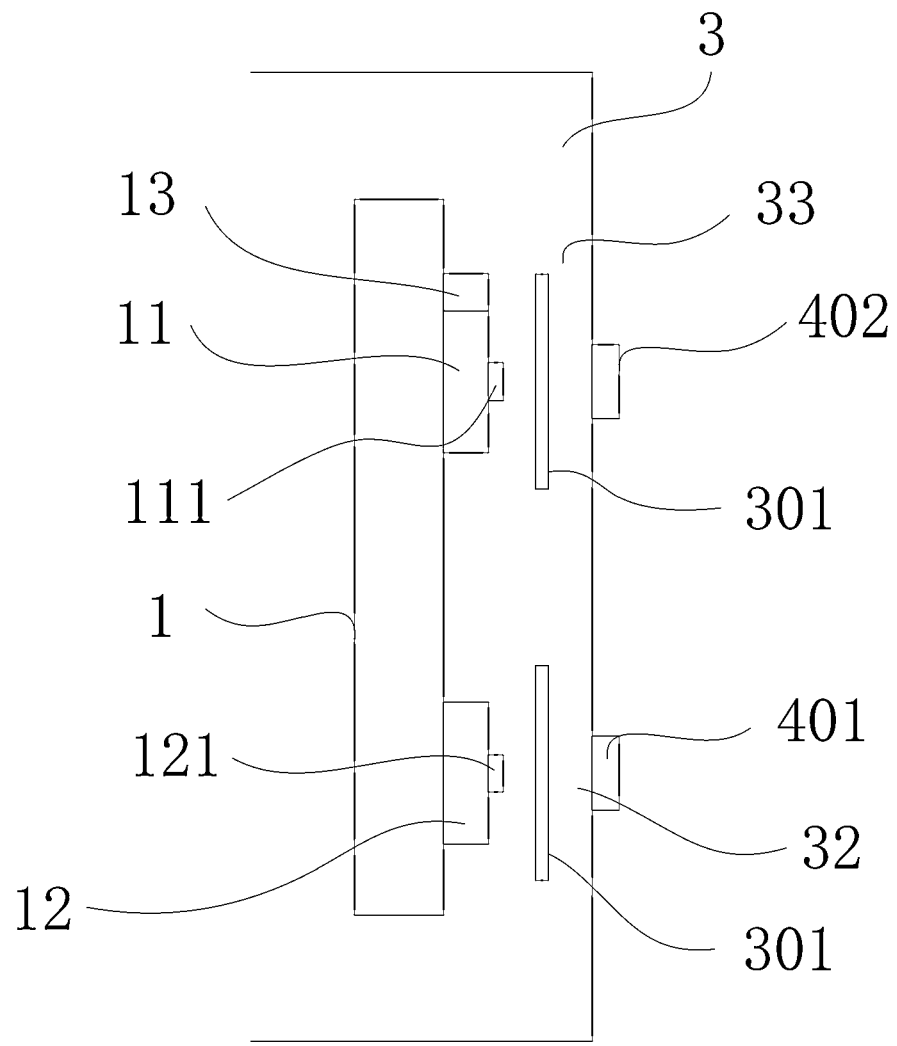
FIG. 9 is a cross-section view of the side of the heating clothing control device and the housing.

Specifically, and referring to FIG. 3 and FIG. 9, the housing 3 includes an inner cavity, which is mainly used to accommodate the control circuit board 1. The outer periphery of the inner cavity of the housing 3 is provided with an extension edge 31 extending outward. The heating clothing control device is arranged on the external heating clothing through the extension edge 31, so that the extension edge 31 is embedded inside the heating clothing, and the housing 3 is exposed on the outer surface of the heating clothing.

Further, and referring to FIG. 2, the control circuit board 1 includes a plurality of heating control modules 12 with an indicator light 13, and each of the heating control modules 12 can be connected to a heating area 300 of an external heating clothing through the connection wire 2. The heating control module 12 is mainly used to control turning on or off of the heating area 300 of the external heating clothing. The indicator light 13 on the heating control module 12 is mainly used to identify whether the heating area 300 of the external heating clothing is turned on. For example: when a heating area 300 is turned on, the corresponding indicator light 13 on the heating control module 12 turns on.

Further, the indicator light control module 11 is mainly used to control the indicator light 13 on the heating control module 12. The indicator light control module 11 can control the indicator light 13 on the heating control module 12 to switch in a normal working state and a normally closed state. For example, when the wearer is in a crowded outdoor place and the heating control module 12 is turned on, if the indicator light 13 corresponding to the heating control module 12 remains on, it will affect the aesthetic appearance of the heating clothing and may also cause discomfort to the wearer. When the indicator light control module 11 controls the indicator light 13 on the heating control module 12 to be in a normally closed state, and the heating control module 12 is turned on, its corresponding indicator light 13 will also turn off.

In this embodiment, by designing a heating clothing control device with a simple structure and easy operation, the volume of the heating clothing control device can be effectively reduced, thereby reducing its impact on the appearance of the heating clothing. By providing an indicator light control module 11 to control the indicator lights 13 on multiple heating control modules 12, the wearer can turn off the indicator lights 13 in a timely manner when outdoors. This further helps to effectively avoid the influence of the heating clothing control device on the appearance of the external heated clothing.

Figure 4:
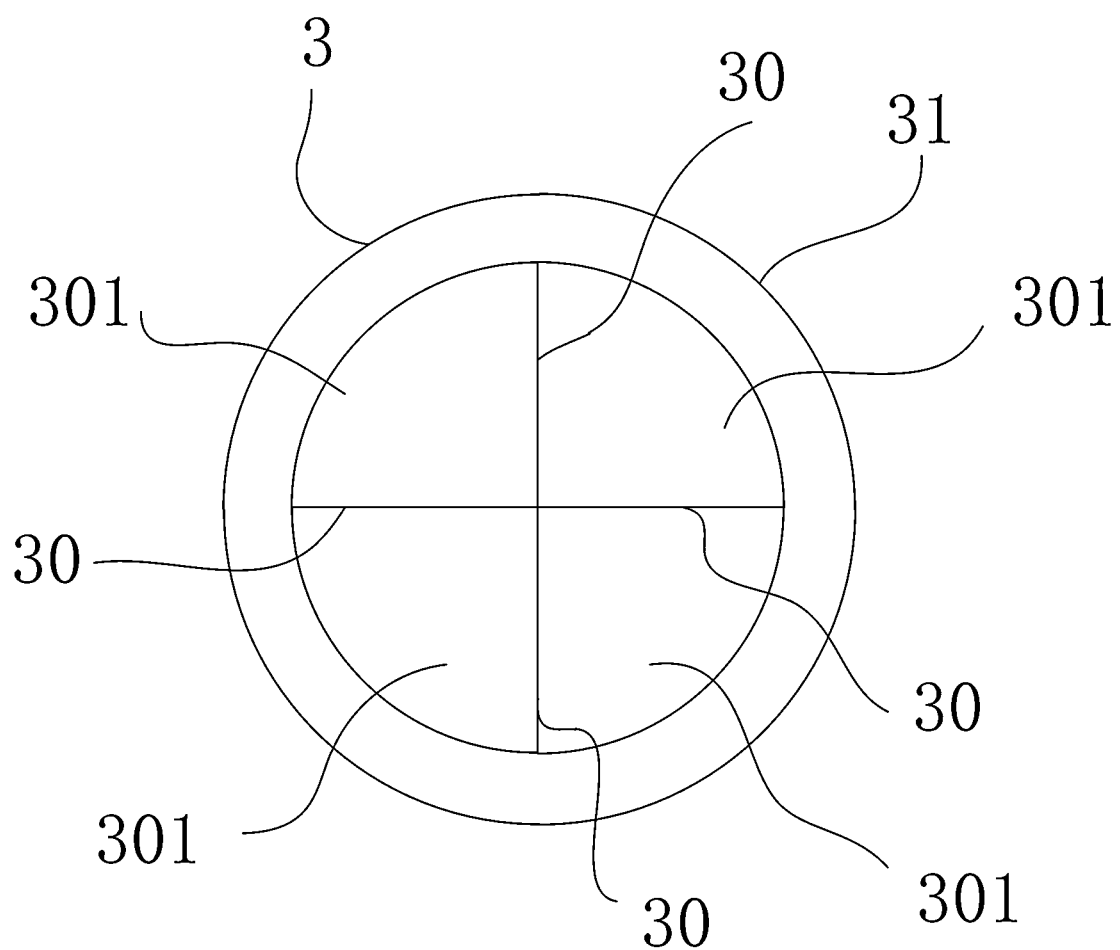
FIG. 4 is a structural schematic diagram of a heating clothing control device with limiting plate in the present application.
Figure 5:
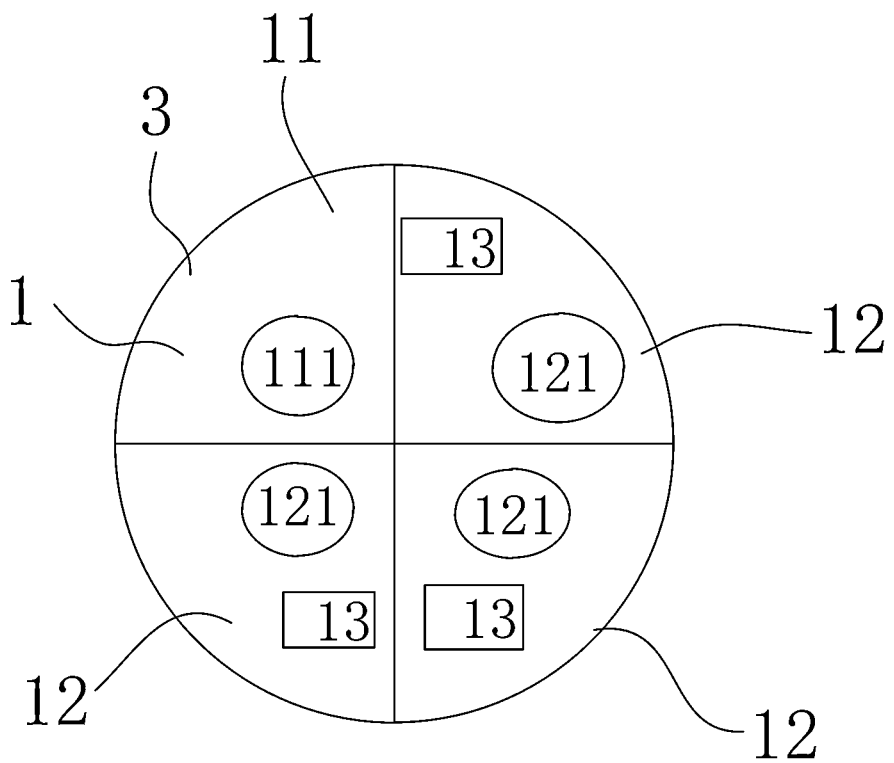
FIG. 5 is a structural schematic diagram of a heating clothing control device with heating control button, an indicator light control button and an indicator light in the present application.

In one embodiment, referring to FIG. 4 and FIG. 9, each heating control module 12 is provided with a heating control button 121, and the indicator light control module 11 is provided with an indicator light control button 111.

Specifically, the heating control button 121 is used as a switch to turn on or off the heating area 300 of the external heating clothing. The heating control button 121 can turn on the heating area 300 of the external heating clothing to start heating, and can also turn off the heating area 300 of the heating clothing to stop heating. The indicator light control button 111 is used as a switch for the indicator light 13 on the heating control module 12. The indicator light 13 on the heating control module 12 can be turned on and off through the indicator light control button 111.

Wherein, when the wearer is in a crowded place, he can press the indicator light control button 111 to turn off the indicator light 13 on the heating control module 12, which can effectively prevent the indicator light 13 on the heating control module 12 from affecting the appearance of the external heating clothing.

Figure 11:
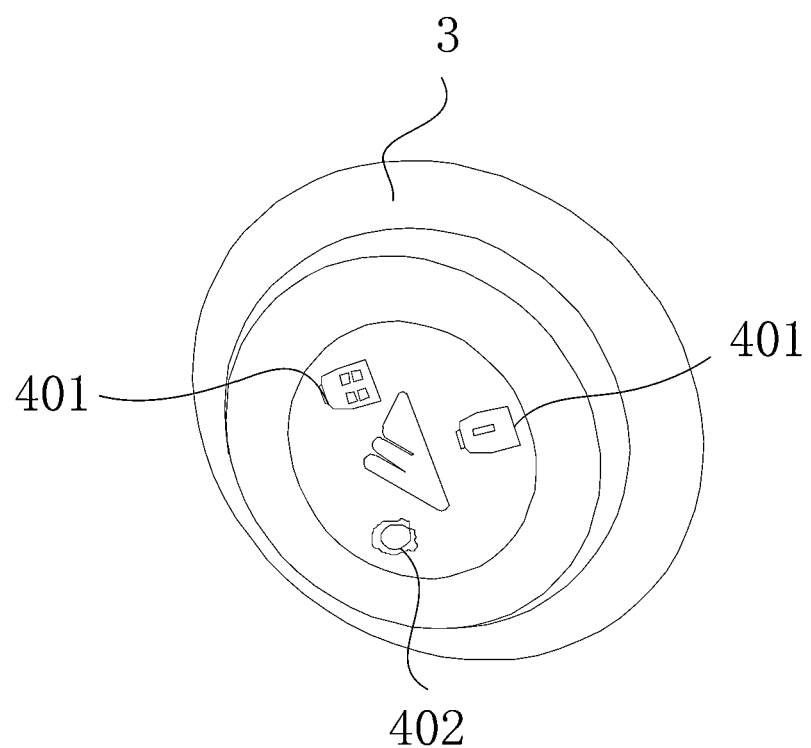
FIG. 11 is a 3D diagram of the heating clothing control device with first protrusions and second protrusion in the present application.

In one embodiment, and referring to FIG. 3, FIG. 4 and FIG. 11, a plurality of heating button accommodation areas 32 corresponding to the heating control buttons 121 are provided in the inner cavity of the housing 3, and first protrusions 401 are provided at positions of the outer surface of the housing 3 corresponds to the heating control buttons 121. Partitions 30 are provided between different accommodation areas 32, and the height of the partitions 30 is greater than the thickness of the limiting plate 301.

Specifically, each heating button accommodation area 32 accommodates one heating control module 12, and each heating control button 121 is provided with a first protrusion 401 in a matching way. When the wearer presses the first protrusion 401 on the outer surface of the housing 3, it will cause the heating control button 121 corresponding to the first protrusion 401 to be pressed, thereby turning on or off the corresponding heating control module 12.

In one embodiment, referring to FIG. 9, an indicator light button accommodation area 33 corresponding to the indicator light control button 111 is provided in the inner cavity of the housing 3, and a second protrusion 402 is provided at a position of the surface of the housing 3 corresponding to the indicator light control button 111.

Specifically, the indicator light button accommodation area 33 accommodates the indicator light control module 11, and the indicator light control button 111 is correspondingly provided with the second protrusion 402 in a matching way. When the wearer presses the second protrusion 402 on the outer surface of the housing 3, it will cause the indicator light control button 111 corresponding to the second protrusion 402 to be pressed, thereby turning on or off the corresponding indicator light control module 11.

In one embodiment, limiting plates 301 are provided between the heating button accommodation area 32 and the heating control button 121, and between the indicator light button accommodation area 33 and the indicator light control button 111.

Specifically, referring to FIG. 9, when the wearer presses the first protrusion 401 on the outer surface of the housing 3, the limiting plate 301 will be pressed together, so that the heating control button 121 corresponding to the first protrusion 401 is pressed, thereby turning on or off the corresponding heating control module 12. When the wearer presses the second protrusion 402 on the outer surface of the housing 3, the limiting plate 301 will be pressed together, so that the indicator light control button 111 corresponding to the second protrusion 402 is pressed, thereby turning on or off the corresponding indicator light control module 11.

Since the heating control button 121 and the indicator light control button 111 are small in size, the area that can be pressed is small. When pressing the first protrusion 401 or the second protrusion 402, it is difficult to accurately press the smaller heating control button 121 or the indicator light control button 111, which causes the failed operation. By providing limiting plates 301 between the heating button accommodation area 32 and the heating control button 121, and between the indicator light button accommodation area 33 and the indicator light control button 111, the area where the heating control button 121 and the indicator light control button 111 can be pressed is increased: thereby improving the pressing success rate and making the pressing more convenient.

Figure 6:
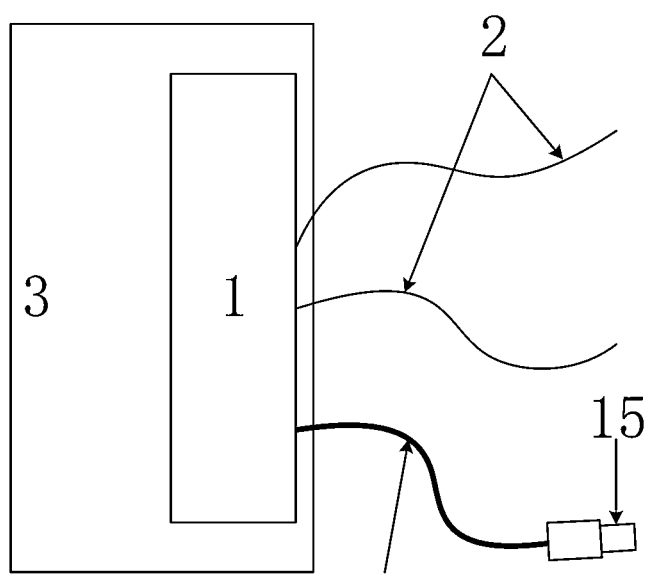
FIG. 6 is a structural schematic diagram of a heating clothing control device with power interface in the present application.

In one embodiment, and referring to FIG. 6, the control circuit board 1 is also provided with a power cord 14 and a power interface 15. The power interface 15 is electrically connected to the control circuit board 1 through the power cord 14 to connect to the external power supply.

Specifically, the power interface 15 is mainly used for the external power supply to provide power for the heating clothing control device, wherein the power interface 15 can be a USB interface or the like.

Figure 7:
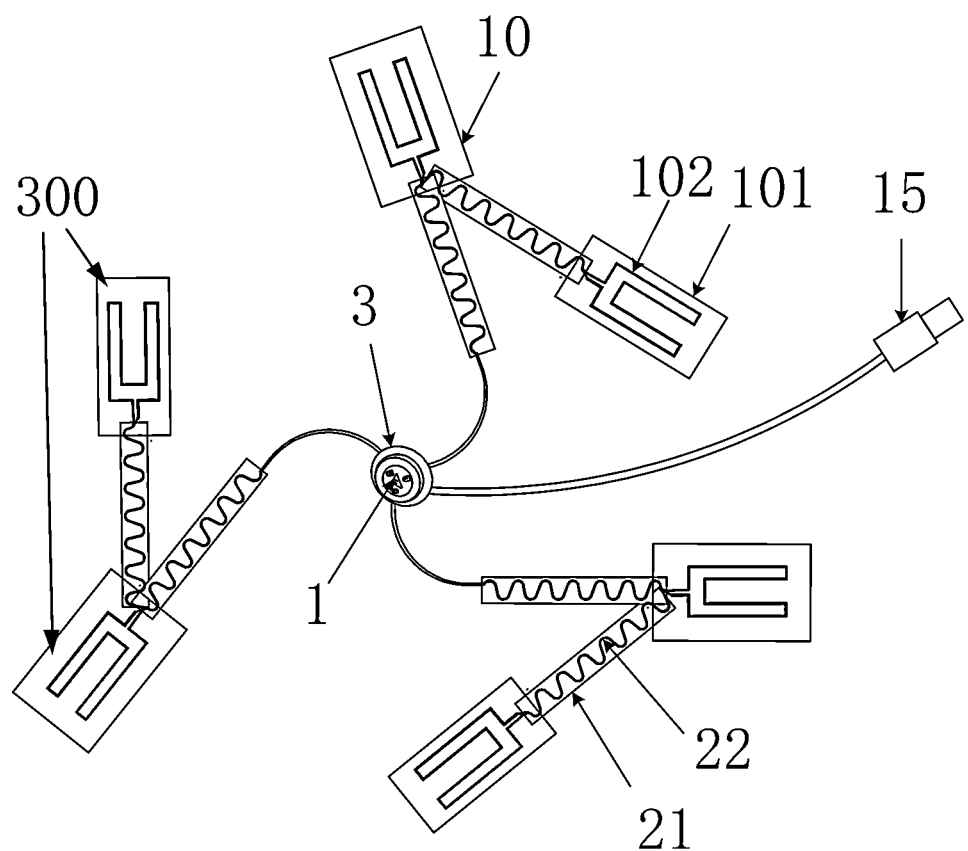
FIG. 7 is a structural schematic diagram of the heating clothing in the present application.
Figure 8:
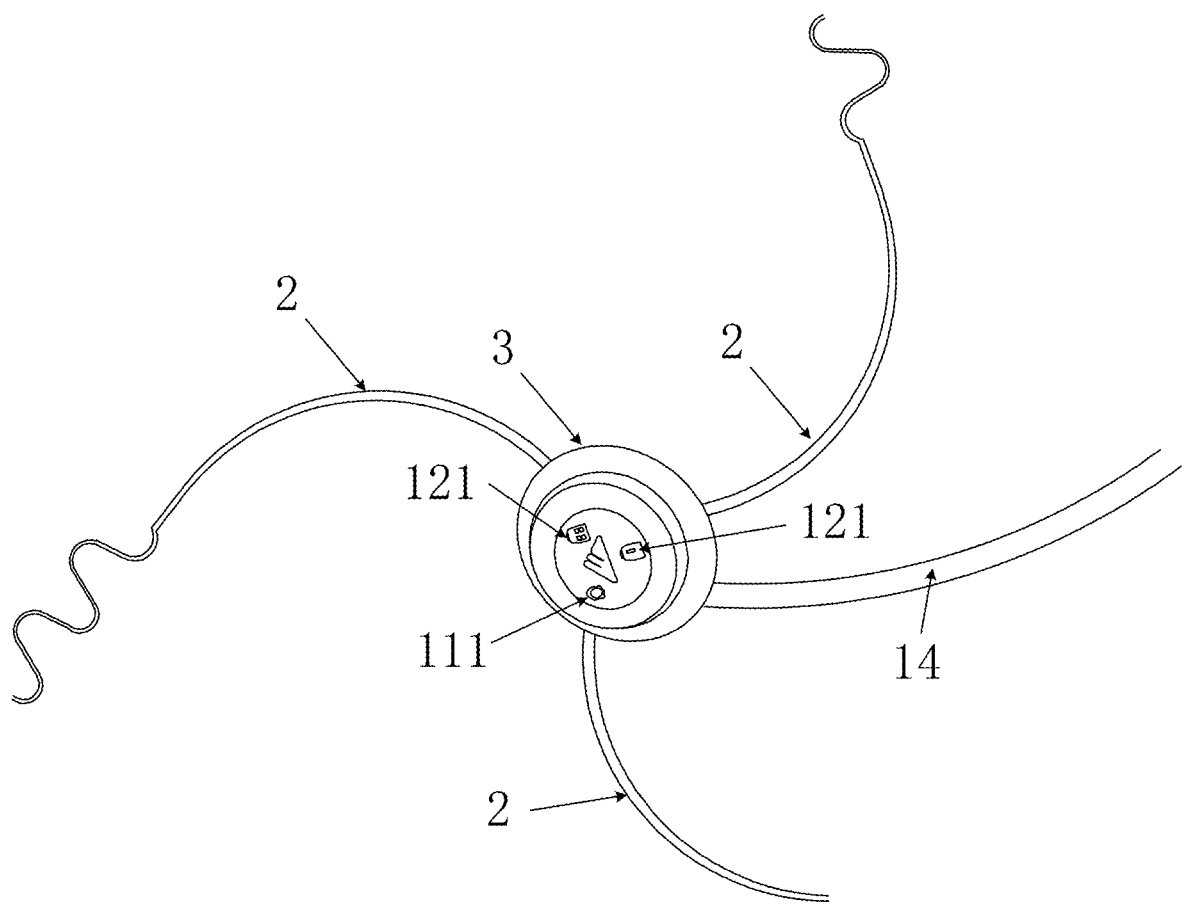
FIG. 8 is an enlarged structural schematic diagram of the control device in FIG. 7.

As shown in FIG. 7 and FIG. 8, the present application also provides a preferred embodiment of a heating clothing.

Referring to FIG. 7 and FIG. 8, the heating clothing includes the heating clothing control device as described above, a heating clothing body and a plurality of heating pieces 10 arranged in the heating clothing body. Each heating piece 10 is connected to a corresponding heating control module 12 through the connection wire 2.

Specifically, the heating piece 10 is arranged in the heating clothing body and is mainly used to generate heat to provide external heat to the wearer. The heating control module 12 is connected to a plurality of heating pieces 10 through the connection wires 2 to achieve control of the plurality of heating pieces 10. When the wearer is in a cold environment and needs to be warmed, the heating control module 12 turns on multiple or one of the heating pieces to provide heat for the wearer. When the wearer leaves the cold environment, then the corresponding heating piece can be turned off through the heating control module 12 to stop providing heat to the wearer.

In one embodiment, the connection wire 2 includes a wire carrier 21 and a wire body 22. The wire carrier 21 is an elastic stretchable band, and the end of the elastic stretchable band is embedded and fixed inside the heating piece. The wire body 22 extends in a bent shape along the length direction of the wire carrier 21 and is arranged inside the wire carrier 21.

Specifically, the wire body 22 is arranged on the wire carrier 21, and the wire body 22 on the wire carrier 21 is arranged in a bent shape. When the wire body 22 is pulled, the wire body 22 arranged in a bent shape can provide additional stretching length to prevent pulling the connections between the wire body 22 and the heating control module 12, and between the wire body 22 and the heating piece. Simultaneously, the wire carrier 21 can share the pulling force, thereby reducing the pulling force on the wire body 22 itself. The pulling force endured by the wire body 22 is minimized, and the likelihood of poor electrical connection is decreased.

Furthermore, the wire carrier 21 is an elastic stretchable band. The elastic stretchable band can stretch when it is pulled, and the wire body 22 in a bent shape can also stretch along with the elastic stretchable belt, thereby prevent pulling the connections between the wire body 22 and the heating control module 12, and between the wire body 22 and the heating piece to avoid the problem of poor electrical connection. Simultaneously, the elastic stretchable band has a better effect of sharing the pulling force.

In one embodiment, the heating piece 10 includes a covering piece 101 and a heating element 102. The heating element 102 is connected to the connection wire 2, and the covering piece 101 covers the end of the connection wire 2, the end of the wire carrier 21 and the heating element 102.

The above are only the best embodiments of the present application and are not used to limit the scope of the present application. All equivalent changes or modifications made according to the scope the claims of the present application are covered by the present application.

What is claimed is:

1. A heating clothing control device, wherein:
   the heating clothing control device includes a control circuit board, connection wires and a housing;
   a plurality of heating control modules are provided on the control circuit board, and each heating control module is connected to a heating area of an external heating clothing through a connection wire;
   a plurality of accommodation areas are provided in the housing, and each accommodation area is provided therein with a limiting plate; and
   the control circuit board is placed in the housing to make the plurality of heating control modules be fixedly mounted in different accommodation areas and respectively abut against the limiting plate in a corresponding accommodation area;
   wherein the control circuit board is further provided with an indicator light control module, and the indicator light control module is connected to the plurality of heating control modules through the connection wires to turn on or turn off indicator lights of the heating control modules, and
   each indicator light control module is provided with an indicator light control button; and each accommodation area includes an indicator light button accommodation area for accommodating the indicator light control button; and the surface of the housing is provided with a second protrusion in a position corresponding to the indicator light control button.

2. The heating clothing control device according to claim 1, wherein: partitions are provided between different accommodation areas, and the height of the partitions is greater than the thickness of the limiting plate.

3. A heating clothing, wherein:
the heating clothing includes the heating clothing control device according to claim 2, and further includes a heating clothing body and a plurality of heating pieces arranged in the heating clothing body; and
each heating piece is connected to a corresponding heating control module through a connection wire.

4. The heating clothing control device according to claim 1, wherein:
each heating control module is provided with a heating control button, and the plurality of accommodation areas include a plurality of heating control button accommodation areas for accommodating heating control buttons; and the surface of the housing is provided with first protrusions in different positions corresponding to the heating control buttons.

5. A heating clothing, wherein:
the heating clothing includes the heating clothing control device according to claim 4, and further includes a heating clothing body and a plurality of heating pieces arranged in the heating clothing body; and
each heating piece is connected to a corresponding heating control module through a connection wire.

6. The heating clothing control device according to claim 1, wherein: the control circuit board is further provided with a power cord and a power interface, and the power interface is electrically connected to the control circuit board through the power cord to connect an external power supply.

7. A heating clothing, wherein:
the heating clothing includes the heating clothing control device according to claim 6, and further includes a heating clothing body and a plurality of heating pieces arranged in the heating clothing body; and
each heating piece is connected to a corresponding heating control module through a connection wire.

8. A heating clothing, wherein:
the heating clothing includes the heating clothing control device according to claim 1, and further includes a heating clothing body and a plurality of heating pieces arranged in the heating clothing body; and
each heating piece is connected to a corresponding heating control module through a connection wire.

9. The heating clothing according to claim 8, wherein: each connection wire includes a wire carrier and a wire body, and the wire body extends in an undulating shape or a sinusoidal shape along the length direction of the wire carrier and is arranged inside the wire carrier.

10. The heating clothing according to claim 9, wherein: the wire carrier is an elastic stretchable band, and the end of the elastic stretchable band is embedded and fixed inside the heating piece.

11. The heating clothing according to claim 9, wherein: each heating piece includes a covering piece and a heating element; the heating element is connected to the connection wire, and the covering piece covers the end of the connection wire, the end of the wire carrier and the heating element.

* * * * *